(12) United States Patent
Higbie et al.

(10) Patent No.: US 11,313,324 B2
(45) Date of Patent: Apr. 26, 2022

(54) SYSTEMS AND METHODS OF ACOUSTIC DAMPENING IN A GAS TURBINE ENGINE

(71) Applicant: Rolls-Royce Corporation, Indianapolis, IN (US)

(72) Inventors: Jeff Higbie, Indianapolis, IN (US); Robert Heeter, Noblesville, IN (US); Ben Hodgson, Indianapolis, IN (US); Jon Rivers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 542 days.

(21) Appl. No.: 16/382,354

(22) Filed: Apr. 12, 2019

(65) Prior Publication Data
US 2020/0325851 A1    Oct. 15, 2020

(51) Int. Cl.
| | |
|---|---|
| *F02K 1/82* | (2006.01) |
| *F02C 7/24* | (2006.01) |
| *B32B 3/12* | (2006.01) |
| *B64D 33/02* | (2006.01) |
| *F01D 25/04* | (2006.01) |

(52) U.S. Cl.
CPC .............. *F02K 1/827* (2013.01); *B32B 3/12* (2013.01); *B64D 33/02* (2013.01); *F01D 25/04* (2013.01); *F02C 7/24* (2013.01); *B64D 2033/0213* (2013.01)

(58) Field of Classification Search
CPC ... B64D 2033/0213; B64D 33/02; F02C 7/24; F01D 25/04; B32B 3/12; F02K 1/827
See application file for complete search history.

(56) References Cited

U.S. PATENT DOCUMENTS

| | | | |
|---|---|---|---|
| 4,449,607 A * | 5/1984 | Forestier ................. | F02K 1/827 181/213 |
| 6,761,245 B2 | 7/2004 | Porte | |
| 6,920,958 B2 | 7/2005 | Harrison | |
| 7,866,440 B2 * | 1/2011 | Douglas ................. | B64D 33/02 181/213 |
| 7,866,939 B2 | 1/2011 | Harper et al. | |
| 7,967,108 B2 * | 6/2011 | Harper .................... | F02C 7/045 181/292 |
| 8,186,934 B2 | 5/2012 | Humphries | |
| 8,650,853 B2 * | 2/2014 | Porte ....................... | F02C 7/045 60/226.1 |

(Continued)

*Primary Examiner* — Forrest M Phillips
(74) *Attorney, Agent, or Firm* — Barnes & Thornburg LLP

(57) ABSTRACT

Systems and methods are presented for acoustic dampening in a rotating machine. The rotating machine has a rotatable shaft defining an axis of rotation and a gas flowpath. A system comprises an acoustic panel affixed to an annular casing. The acoustic panel comprises an acoustic treatment member extending between a radially inner skin and radially outer skin. The radially inner skin extends the full axial and circumferential dimensions of the acoustic panel, and the acoustic treatment member overlays the entirety of the radially inner skin. The acoustic panel is positioned so that the radially outer skin abuts the casing, the abutting surfaces being configured to effect relative axial movement between the surfaces while maintaining contact between the surfaces. The acoustic panel is affixed in position to the casing by one or more fasteners passing through the casing and a portion of the radially outer skin.

20 Claims, 5 Drawing Sheets

(56) References Cited

U.S. PATENT DOCUMENTS

| | | | |
|---|---|---|---|
| 8,763,753 B2 * | 7/2014 | Kray | F02C 7/24 |
| | | | 181/292 |
| 9,290,274 B2 | 3/2016 | Roach et al. | |
| 9,932,897 B2 | 4/2018 | Riou et al. | |
| 9,938,852 B2 | 4/2018 | Lumbab et al. | |
| 10,024,191 B2 * | 7/2018 | Totten | F01D 21/045 |
| 10,294,960 B2 * | 5/2019 | Robertson | F02C 7/05 |
| 10,415,472 B2 * | 9/2019 | Desjoyeaux | B64D 33/02 |
| 2005/0284690 A1 * | 12/2005 | Proscia | F02K 1/827 |
| | | | 181/214 |
| 2008/0017442 A1 * | 1/2008 | Douglas | B64D 33/02 |
| | | | 181/213 |
| 2008/0069688 A1 | 3/2008 | Harper et al. | |
| 2009/0321178 A1 | 12/2009 | Durchholz et al. | |
| 2011/0211943 A1 * | 9/2011 | Belbeck | F02C 7/045 |
| | | | 415/182.1 |
| 2016/0076400 A1 * | 3/2016 | Weir | B64D 33/06 |
| | | | 415/119 |

\* cited by examiner

SYSTEMS AND METHODS OF ACOUSTIC DAMPENING IN A GAS TURBINE ENGINE

BACKGROUND

Acoustic panels may be used in rotating machines to reduce, dampen, or treat noise emanating from the machine. For example, acoustic panels may be used in modern gas turbine engines in an effort to meet regulatory restrictions on noise emissions from the engine. Generally speaking, acoustic panels may be used to line radially outer portions of gas flowpaths in the engine. The acoustic panels typically comprise a structure or materials that reduce, dampen, or treat noise.

SUMMARY

According to some aspects of the present disclosure, a system is disclosed for acoustic dampening in a rotating machine. The rotating machine has a rotatable shaft defining an axis of rotation and a gas flowpath. The system comprises an annular casing and an acoustic panel. The annular casing is disposed radially outward of the rotatable shaft. The annular casing has a radially inward facing mating surface. The acoustic panel is affixed to the annular casing and has an axial dimension and a circumferential dimension. The acoustic panel comprises a radially inner skin, a radially outer skin, and an acoustic treatment member. The radially inner skin faces the rotatable shaft and defines at least a portion of the radially outer boundary of the gas flowpath. The radially inner skin extends the full axial dimension and the full circumferential dimension of the acoustic panel. The radially outer skin forms a radially outward facing mating surface. The acoustic treatment member extends between the radially inner skin and radially outer skin and overlays the entirety of the radially inner skin. The acoustic treatment member defines a cavity bounded in part by a portion of the radially outer skin. The acoustic panel is positioned so that the mating surface formed by the radially outer skin abuts the mating surface formed by the casing, the abutting mating surfaces being configured to effect relative axial movement between the surfaces while maintaining contact between the surfaces. The acoustic panel is affixed in position to the casing by one or more fasteners passing through the annular casing and the portion of the radially outer skin bounding the cavity defined by the acoustic treatment member.

In some embodiments the rotating machine further comprises a fan track liner and wherein the acoustic panel is positioned forward of and adjacent the fan track liner. In some embodiments the rotating machine further comprises a fan track liner and wherein the acoustic panel is positioned aft of and adjacent the fan track liner. In some embodiments the gas flowpath comprises a bypass flowpath of the rotating machine. In some embodiments the cavity defined by the acoustic treatment member has a radial dimension less than the radial distance between the radially inner skin and the radially outer skin.

In some embodiments the acoustic treatment member comprises a plurality of walls extending between the radially inner skin and radially outer skin to define a plurality of radially oriented cells. In some embodiments the plurality of radially oriented cells form a honeycomb. In some embodiments the cavity defined by the acoustic treatment member is positioned along a first axial edge of the acoustic panel, and wherein the acoustic panel is configured to receive a second fastener proximate an opposing axial edge of the acoustic panel. In some embodiments one or more of the plurality of radially oriented cells are radially segmented by an axially extending member that extends the full axial and circumferential dimension of the acoustic panel.

According to further aspects of the present disclosure, a system is disclosed for acoustic dampening in a rotating machine. The rotating machine has a rotatable shaft defining an axis of rotation and a gas flowpath. The system comprises an annular casing and a pair of acoustic panels. The annular casing is disposed radially outward of the rotatable shaft and has a radially inward facing mating surface. The pair of acoustic panels are affixed to the annular casing. Each of the acoustic panels has an axial dimension and a circumferential dimension. Each of the acoustic panels comprises a radially inner skin, a radially outer skin, and an acoustic treatment member. The radially inner skin faces the rotatable shaft and defines at least a portion of the radially outer boundary of the gas flowpath and extends the full axial dimension and the full circumferential dimension of the acoustic panel. The radially outer skin forms a radially outward facing mating surface. The acoustic treatment member extends between the radially inner skin and radially outer skin and overlays the entirety of the radially inner skin. The acoustic treatment member defines a cavity bounded in part by a portion of the radially outer skin. Each of the acoustic panels is positioned so that the mating surface formed by the radially outer skin abuts the mating surface formed by the casing, the abutting mating surfaces being configured to effect relative axial movement between the surfaces while maintaining a radial alignment of the respective acoustic panel. The pair of acoustic panels are spaced apart at a distance less than the distance required to permit removal of a panel by radially inward movement.

In some embodiments each of the acoustic panels is affixed in position to the casing by one or more fasteners passing through the annular casing and the portion of the radially outer skin bounding the cavity defined by the acoustic treatment member. In some embodiments the acoustic treatment member of each of the acoustic panels comprises a plurality of walls extending between the radially inner skin and radially outer skin to define a plurality of radially oriented cells. In some embodiments the plurality of radially oriented cells of each of the acoustic panels form a honeycomb, and wherein one or more of the plurality of radially oriented cells are radially segmented by an axially extending member. In some embodiments one or more of the radially inner skin, radially outer skin, and axially extending member of each of the pair of acoustic panels comprises composite. In some embodiments one or more of the radially inner skin, radially outer skin, and axially extending member of each of the pair of acoustic panels comprises fiberglass.

In some embodiments the rotating machine further comprises a fan track liner and wherein the pair of acoustic panels are positioned forward of and adjacent the fan track liner. In some embodiments the rotating machine further comprises a fan track liner and wherein the pair of acoustic panels are positioned aft of and adjacent the fan track liner.

According to still further aspects of the present disclosure, a method is disclosed for mounting an acoustic panel array in a rotating machine. The rotating machine has a rotatable shaft defining an axis of rotation. The method comprises providing an annular casing disposed radially outward of the rotatable shaft, the annular casing having a radially inward facing mating surface; positioning a first acoustic panel to abut the annular casing, the first acoustic panel having an axial dimension and a circumferential dimension and comprising an acoustic treatment member disposed between a radially inner skin and a radially outer skin, the radially inner skin extending the full axial dimension and full circumferential dimension of the first acoustic panel, the radially outer skin forming a radially outward facing mating surface, the first acoustic panel positioned so that the mating surface formed by the radially outer skin abuts the mating surface formed by the casing, the abutting mating surfaces being configured to effect relative axial movement between the surfaces while maintaining contact between the surfaces; and affixing the first acoustic panel to the annular casing with a fastener passing through the annular casing and the radially outer skin.

In some embodiments the method further comprises positioning a second acoustic panel adjacent the first acoustic panel by axial movement of the second acoustic panel, the second acoustic panel having an axial dimension and a circumferential dimension and comprising an acoustic treatment member disposed between a radially inner skin and a radially outer skin, the radially inner skin extending the full axial dimension and full circumferential dimension of the second acoustic panel, the radially outer skin forming a radially outward facing mating surface, the second acoustic panel positioned so that the mating surface formed by the radially outer skin abuts the mating surface formed by the casing, the abutting mating surfaces being configured to effect relative axial movement between the surfaces while maintaining contact between the surfaces; and affixing the second acoustic panel to the annular casing with a fastener passing through the annular casing and the radially outer skin.

In some embodiments the acoustic treatment member defines a cavity bounded in part by a portion of the radially outer skin, and wherein the first acoustic panel is affixed in position to the casing by one or more fasteners passing through the annular casing and the portion of the radially outer skin bounding the cavity defined by the acoustic treatment member.

BRIEF DESCRIPTION OF THE DRAWINGS

The following will be apparent from elements of the figures, which are provided for illustrative purposes.

Figure 1:
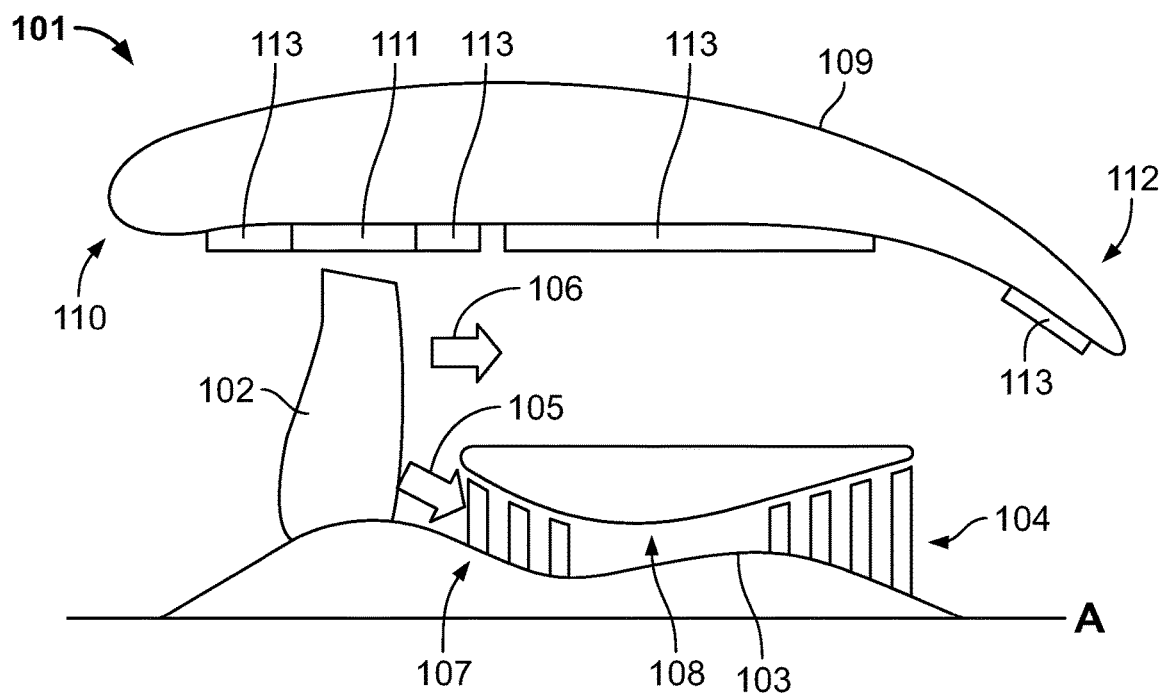
FIG. 1 is a schematic cross-sectional view of acoustic panels positioned in a rotating machine in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

FIG. 1 presents a schematic cross-sectional view of the placement of acoustic panels 113 in a gas turbine engine 101. The engine 101 may comprise a fan 102 driven by a turbine 104 via a rotatable shaft 103. The shaft 103 defines an axis of rotation A. Air passing through the fan 102 is split into a core flowpath 105 and a bypass flowpath 106. The core flowpath 105 comprises a compressor 107, combustor 108, and turbine 104. The bypass flowpath 106 is disposed radially outward of the core flowpath 105. The engine 101 is encased by a casing 109. The casing 109 may define an inlet cowl 110. A fan track liner 111 may be affixed to the casing 109 and positioned radially outward of the fan 102. The engine 101 may have a thrust reverser 112.

The acoustic panels 113 may be positioned generally in one or more of the following locations: in the inlet cowl 110 forward of the fan track liner 111; in the inlet cowl 110 aft of the fan track liner 111; along the casing 109 that defines a portion of the bypass flowpath 106; or in the thrust reverser 112. One or more acoustic panels 113 may be arranged about the circumference of a gas flowpath to form an annular acoustic panel array. An array may be formed by any number of acoustic panels 113. For example, an annular acoustic panel array may be formed by four acoustic panels 113 positioned in axial alignment about a circumference of a gas flowpath.

The acoustic panels 113 may be mounted by one of two methods. First, hangers may extend radially inward from the casing 109, usually along an axially forward or axially aft edge of the acoustic panel 113. The acoustic panel 113 is moved in a radially outward direction to engage the hangers, and is affixed to the hangers via a fastener. Since this first mounting method requires moving the acoustic panel 113 from a radially interior portion of the gas flowpath in a radially outward direction to engage the casing 109 and hangers extending therefrom, it is necessary to design circumferential gaps between adjacent acoustic panels 113 to allow for installing and removing the acoustic panels 113. In other words, without gaps between the acoustic panels 113 adjacent panels would interfere with each other in a manner such that a panel would not be able to be installed and/or removed. However, these circumferential gaps are undesirable because they can have significant negative consequences for the treatment of noise.

A second method of mounting an acoustic panel 113 to the casing 109 may use a fastener such as a bolt that passes through an internal portion of the acoustic panel 113. With the acoustic panel 113 positioned against the casing 109, the fastener is moved from a radially interior portion of the gas flowpath in a radially outward direction to engage the acoustic panel 113 and casing 109, and therefore affix the acoustic panel 113 to the casing 109. With this method, adjacent acoustic panels 113 may be circumferentially spaced as described above with reference to a first method of mounting, or the circumferential gaps may be reduced and the acoustic panel 113 may be positioned with some combination of axial and radial movement. Although the circumferential gaps described in the first method may be greatly reduced in this second method of mounting an acoustic panel 113, the treatment of noise may still be significantly impacted by the need to leave portions of the acoustic panel 113 exposed to the gas flowpath in order to access the fasteners for installation and removal of the panel.

An alternative for affixing the acoustic panels 113 to the casing 109 would be the use of an adhesive. However, acoustic panels 113 typically are required to be removed during certain maintenance events. Given the fragility of the acoustic panels 113, it is not feasible to adhere them to the casing 109 and the subsequently remove them for engine maintenance without severely damaging or destroying the acoustic panels 113.

The present disclosure is directed to systems and methods of acoustic dampening in rotating machines. A system for acoustic dampening may include an acoustic panel that has a continuous radially inner surface and is positioned via axial motion rather than radial motion. Such an acoustic panel may offer substantial improvements to treatment of noise in a rotating machine by reducing and/or eliminating gaps and apertures in the acoustic treatment surface of an acoustic panel array. The acoustic panel may have a radially inner skin that extends the full axial and circumferential dimensions of the acoustic panel. In other words, the acoustic panel does not have apertures through the radially inner skin of the acoustic panel to allow access to fasteners for installation and removal of the panel. The acoustic panel may have a radially outer skin that forms a mating surface that abuts a radially inner surface of an engine casing, the mating surface configured to effect relative axial movement between the mating surface and the inner surface of the engine casing while maintaining contact between the surfaces.

Figure 2:
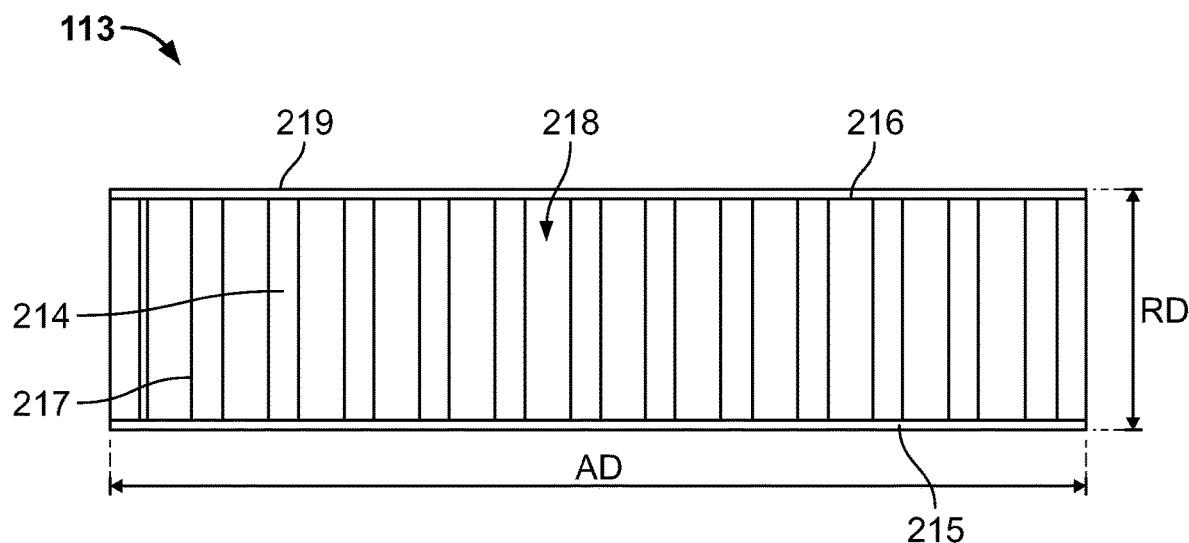
FIG. 2 is a schematic cross-sectional view of an acoustic panel in accordance with some embodiments of the present disclosure.
Figure 3:
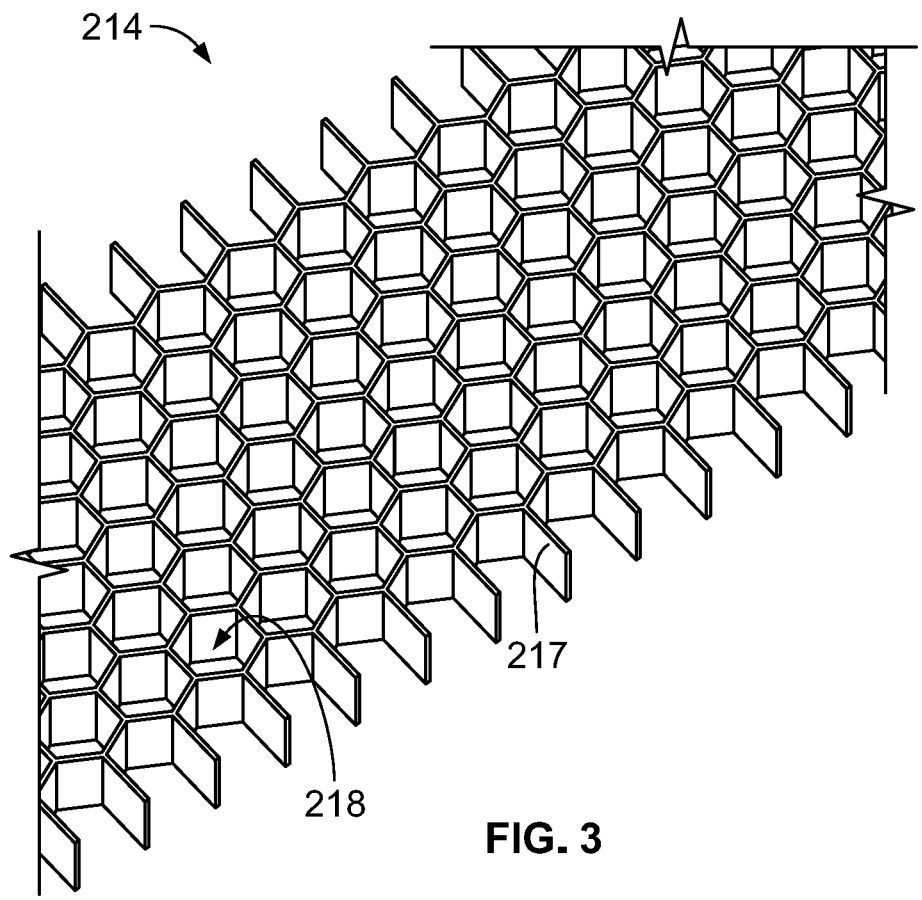
FIG. 3 is an isometric view of one example of an acoustic treatment member of an acoustic panel in accordance with some embodiments of the present disclosure.

FIG. 2 provides a schematic cross-sectional view of an acoustic panel 113, with the cross section taken along an axis of rotation A of the rotating machine. FIG. 3 provides an isometric view of an acoustic treatment member 214 of an acoustic panel 113.

Each acoustic panel 113 may comprise an acoustic treatment member 214 extending between a radially inner skin 215 and radially outer skin 216. The acoustic panel 113 has an axial dimension AD, a radial dimension, RD, and a circumferential dimension CD that, in FIG. 2, would extend into and out of the page. The acoustic treatment member 214 may have a plurality of walls 217 that define a plurality of radially-oriented cells 218. The walls 217 may comprise aluminum or composite. The acoustic treatment member 214 may entirely overlay the radially inner skin 215.

The walls 217 of the acoustic treatment member 214 may define a plurality of radially oriented cells 218 in a honeycomb as shown in FIG. 3. The acoustic treatment member 214 may provide structural support and/or acoustic treatment for the acoustic panel 113. The acoustic treatment member 214 may have a variety of shapes, geometries, dimensions, and material properties that may be more or less effective at acoustic treatment than other of the shapes, geometries, dimensions, and material properties.

The acoustic panel 113 of FIG. 2 comprises an acoustic treatment member 214 radially bound by the radially inner skin 215 and radially outer skin 216. The radially inner skin 215 faces the rotatable shaft 103 of the engine 101. The radially inner skin 215 may define at least a portion of a radially outer boundary of a gas flowpath of the engine, such as the bypass flowpath 106. The radially inner skin 215 may be arcuate, and may extend the full axial dimension AD and circumferential dimension CD of the acoustic panel 113.

The radially outer skin 216 faces away from the rotatable shaft 103 and toward the casing 109. The radially outer skin 216 may define a radially outward facing mating surface 219. The radially outer skin 216 may be arcuate. Each of the radially inner skin 215 and radially outer skin 216 may comprise composite, such as a fiber reinforced composite such as fiberglass or similar material.

Figure 4:
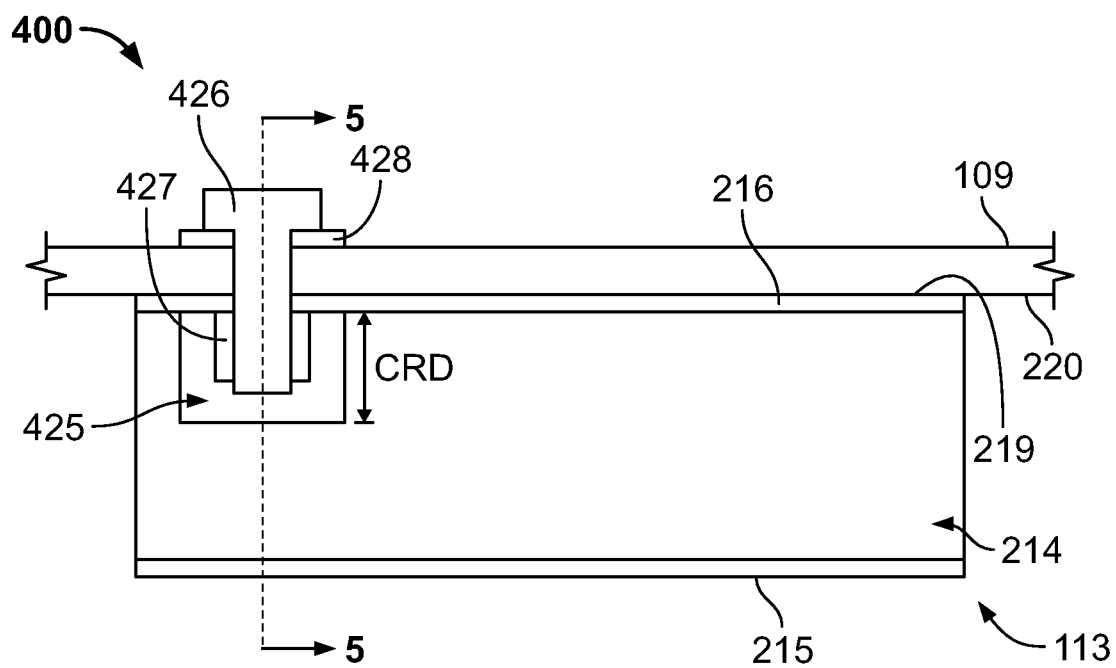
FIG. 4 is a schematic cross-sectional view of an acoustic panel affixed to a casing in accordance with some embodiments of the present disclosure.
Figure 5:
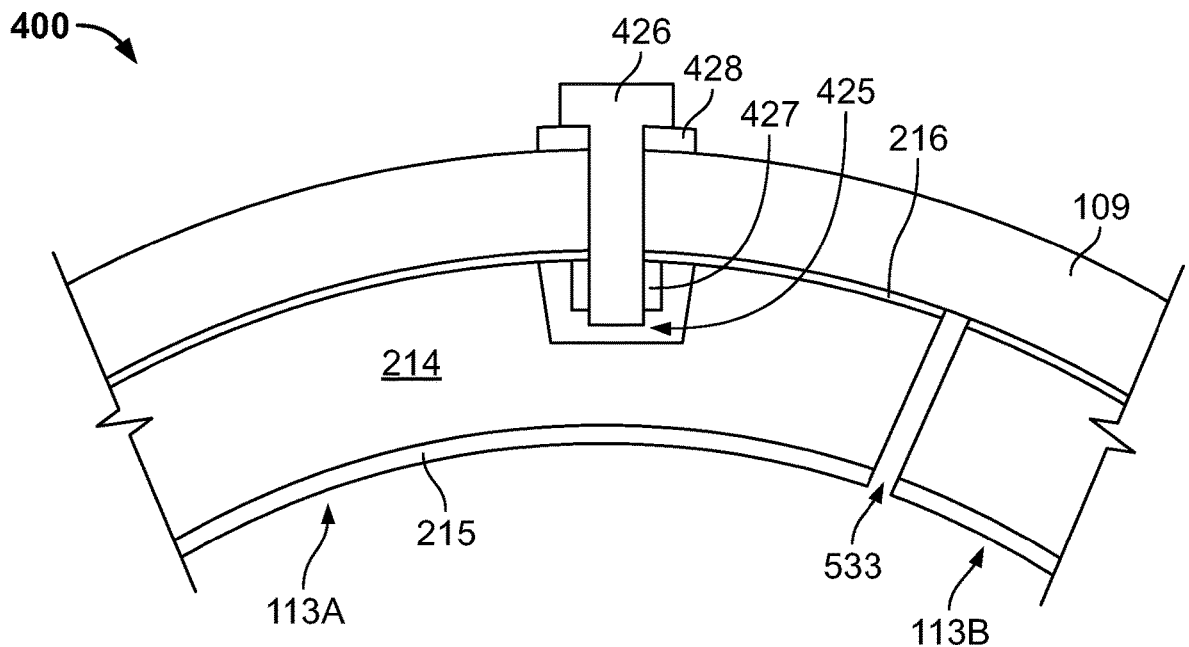
FIG. 5 is a schematic cross-sectional view down the axis of a rotating machine of an acoustic panel affixed to a casing in accordance with some embodiments of the present disclosure.

FIG. 4 provides a schematic cross-sectional view of an acoustic panel 113 affixed to a casing 109, with the cross section taken along an axis A of the engine 101. FIG. 5 provides a schematic cross-sectional view of an acoustic panel 113 affixed to a casing 109, with the cross section viewed down the axis A of the engine 101. As shown in FIGS. 4 and 5, a system 400 for acoustic dampening in a rotating machine such as an engine 101 may comprise an annular casing 109 and an acoustic panel 113 affixed to the annular casing 109.

The annular casing 109 of the engine 101 is disposed radially outward of at least a portion of the rotatable shaft 103. The annular casing 109 may have a radially inward facing mating surface 220.

As described above, the acoustic panel 113 may comprise an acoustic treatment member 214 extending between a radially inner skin 215 and a radially outer skin 216. The radially inner skin 215 faces the rotatable shaft 103 and extends the full axial dimension AD and circumferential dimension CD of the acoustic panel 113. The radially outer skin 216 forms a radially outward facing mating surface 219.

The acoustic treatment member 214 entirely overlays the radially inner skin 215. Thus in the system 400, there are no apertures through the radially inner skin 215 necessary to access fasteners that are secured from a radially inward position relative to the acoustic panel 113. The acoustic treatment member 214 may define a cavity 425, and the cavity 425 may be bounded in part by a portion of the radially outer skin 216. The walls 217 of the acoustic treatment member 214 are omitted from FIGS. 4 through 7 for clarity. The cavity 425 may be defined by one or more of the walls 217, by additional members, or by a reinforcement material such as a potting material. The cavity 425 may have a cavity radial dimension CRD that is less than the radial dimension RD of the acoustic panel 113. The cavity 425 may have a cavity radial dimension CRD that is less than the radial distance between the radially inner skin 215 and radially outer skin 216.

The acoustic panel 113 may be positioned so that the mating surface 219 of the radially outer skin 216 abuts the mating surface 220 of the casing 109. In some embodiments, at least or only a portion of the mating surface 219 of the radially outer skin 216 may abut at least or only a portion of the mating surface 220 of the casing 109. The mating surfaces 219 and 220 may be configured to effect relative axial movement between the mating surfaces 219, 220 while maintaining contact between the mating surfaces 219, 220.

When positioning the acoustic panel 113 relative to the casing 109, the acoustic panel 113 may be moved radially outward to abut the casing 109 in a position axially forward of the final, installed position of the acoustic panel 113 and then moved in an axially aft direction to move the acoustic panel 113 into its final and installed position. Once so positioned, the acoustic panel 113 may be affixed to the casing 109 via one or more fasteners 426.

The fastener 426 may be a bolt. The fastener may begin in a position radially outward from the casing 109 and be passed in a radially inward direction through the casing 109 and radially outer skin 216 and into the cavity 425 of the acoustic panel 113. The fastener 426 may pass through the portion of the radially outer skin 216 bounding the cavity 425 defined by the acoustic treatment member 214. The fastener may comprise a bolt, nut 427, and washer 428. A head of the fastener 426 is positioned radially outward of the casing 109.

An acoustic panel array may be formed by one or more acoustic panels 113 described above. For example, FIG. 5 shows a first acoustic panel 113A affixed to the casing 109 adjacent a second acoustic panel 113B, with the acoustic panels 113A, 113B separated by a gap 533. In an acoustic panel array formed from multiple acoustic panels 113, adjacent acoustic panels 113A, 113B may be spaced apart at a distance less than the distance required to permit removal of an acoustic panel 113A, 113B by radially inward movement. The width of the gap 533 separating the first acoustic panel 113A from the second acoustic panel 113B may be less than the distance required to permit removal of one of the acoustic panels 113A, 113B by radially inward movement. Adjacent acoustic panels 113A, 113B may therefore have abutting lateral surfaces, or may be spaced apart by a gap 533 that is smaller than the gap required for radial removal of an acoustic panel 113A, 113B.

The acoustic panel 113 shown in system 400 may be positioned in the inlet cowl 110 of the engine 101, forward of the fan track liner 111. The acoustic panel 113 may be positioned aft of and adjacent the fan track liner 111. In further embodiments, the acoustic panel 113 may be positioned in the bypass flowpath of the engine 101 or at the thrust reverser 112.

Figure 6:
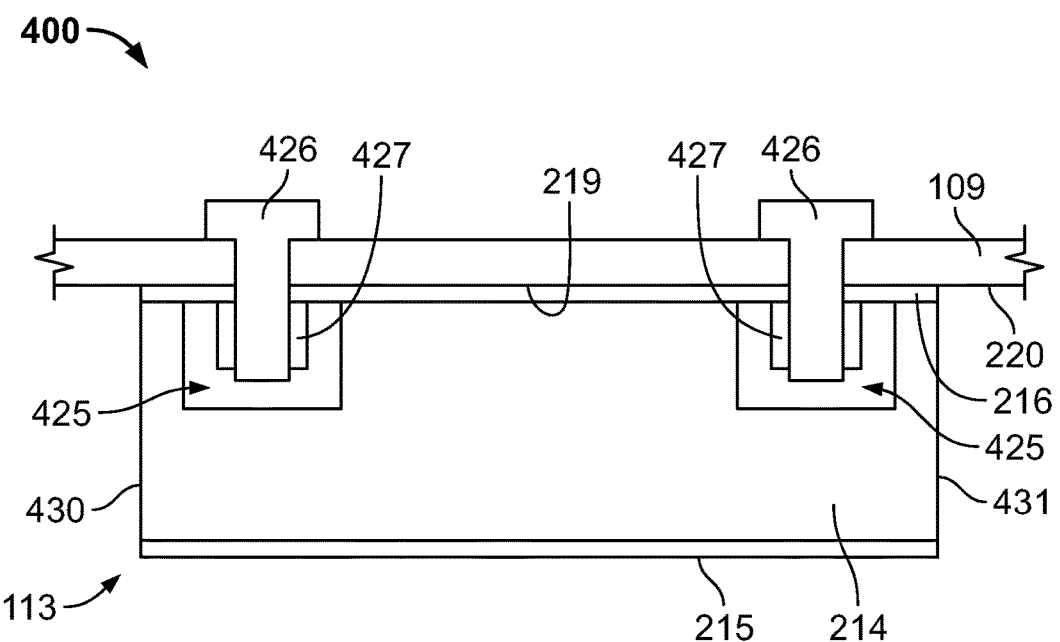
FIG. 6 is a schematic cross-sectional view of an acoustic panel affixed to a casing in accordance with some embodiments of the present disclosure.

In some embodiments the acoustic panel 113 may be affixed to the casing 109 with a pair of fasteners 426, and one fastener 426 may be along an axially forward edge 430 of the acoustic panel 113 and another fastener 426 may be along an axially aft edge 431 of the acoustic panel 113. FIG. 6 provides a schematic cross-sectional view of such an embodiment. The acoustic treatment member 214 defines a pair of cavities 425, and a pair of fasteners 426 are each passed through a respective aperture of the casing 109 and portion of the radially outer skin 216 that bounds the cavity 425 to affix the acoustic panel 113 to the casing 109. As shown in FIG. 6, the cavity 425 defined by the acoustic treatment member 214 may be positioned along a first axial edge 430 of the acoustic panel 113, and the acoustic panel 113 may be configured to receive a second fastener 426 proximate an opposing axial edge 431 of the acoustic panel 113.

Figure 7:
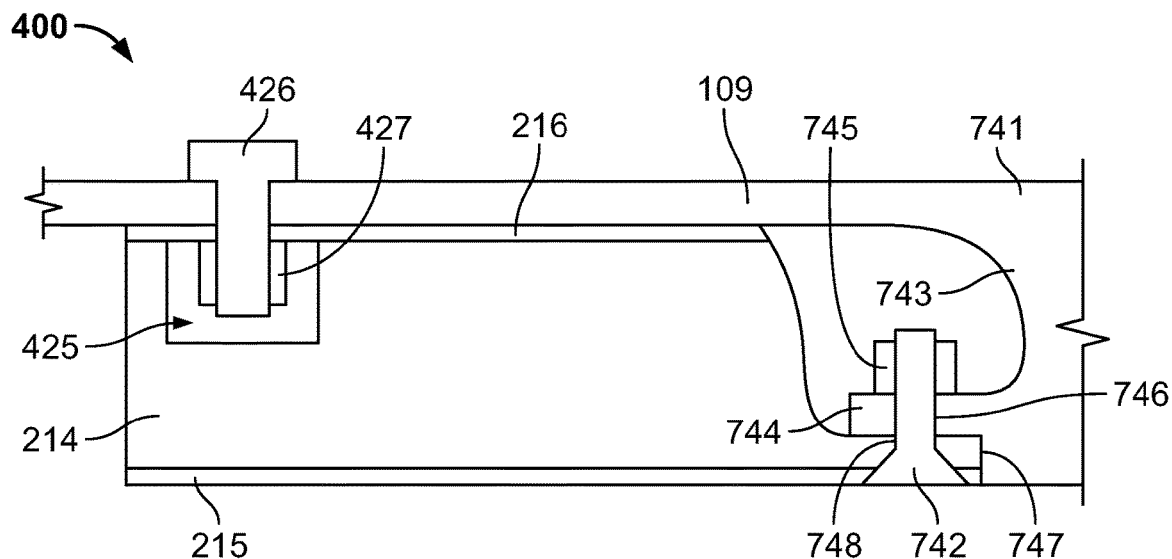
FIG. 7 is a schematic cross-sectional view of an acoustic panel affixed to a casing in accordance with some embodiments of the present disclosure.

In some embodiments the casing 109 may define a hook 741, and the acoustic panel 113 may be adapted to be coupled to a portion of the hook 741 with a fastener 742. The acoustic panel 113 may be affixed to the casing 109 along a first or forward axial edge 430 in the manner described above with reference to FIGS. 4 through 6. The acoustic panel 113 may be affixed to the hook 741 along a second or aft axial edge 431. FIG. 7 illustrates such an embodiment.

The casing 109 may define a hook 741 comprising a radially inward extending member 743 and an axially extending member 744 that extends axially forward from the radially extending member 743. The axially extending member 744 may define an aperture 746, and the radially extending member 744 may define an axial stop 747 used to properly position the acoustic panel 113 during installation and maintain the position of the acoustic panel 113 during operation.

The acoustic panel 113 may have a radial dimension RD that narrows or decreases as the acoustic panel 113 extends from the forward axial edge 430 toward the aft axial edge 431. The narrowed portion of the acoustic panel 113 proximate the aft axial edge 431 may define an aperture 748 that is positioned to align with the aperture 746 of the hook 741. A fastener 742 may pass through the aperture 748 defined by the acoustic panel 113 and the aperture 746 defined by the axially extending member 744 of the hook 741. The fastener 742 may be coupled to a nut 745 to thereby affix the acoustic panel 113 to the hook 741.

Figure 9:
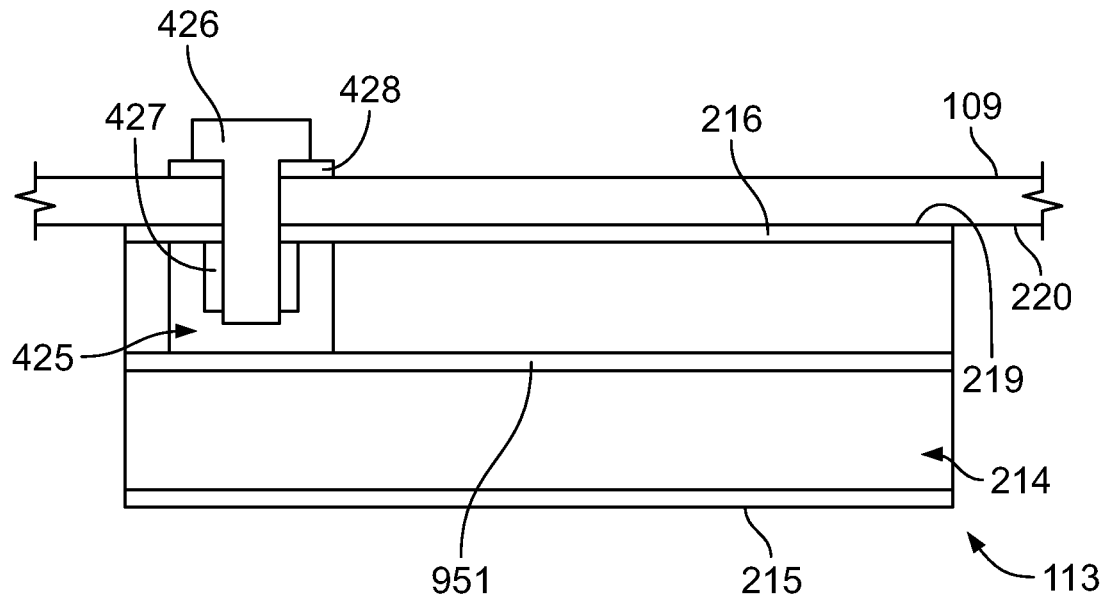
FIG. 9 is a schematic cross-sectional view of an acoustic panel affixed to a casing in accordance with some embodiments of the present disclosure.
Figure 10:
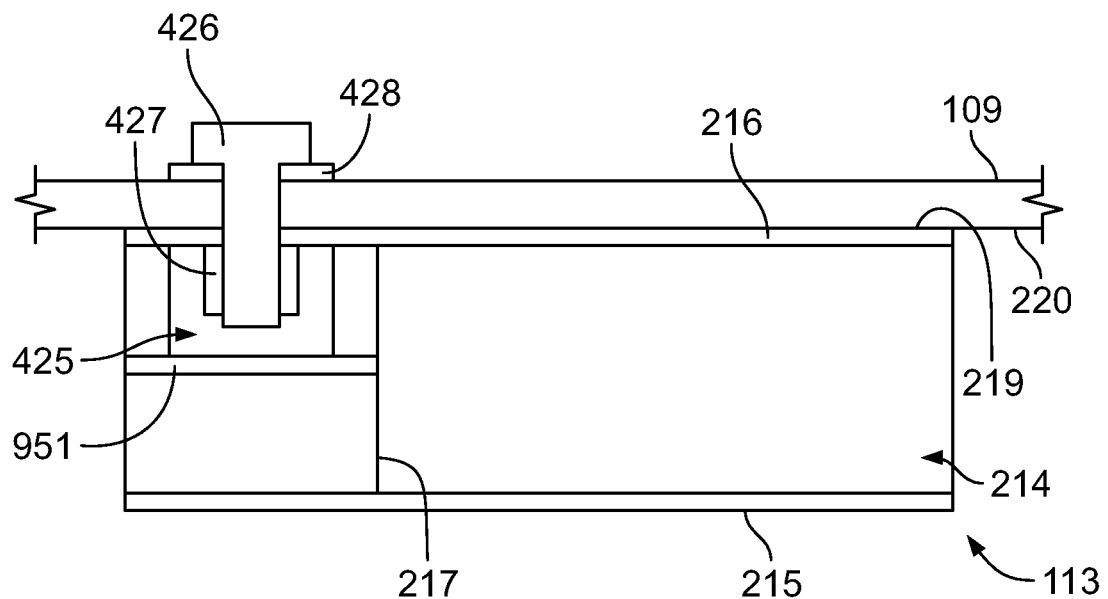
FIG. 10 is a schematic cross-sectional view of an acoustic panel affixed to a casing in accordance with some embodiments of the present disclosure.

In some embodiments an acoustic panel 113 may be fully or partly segmented in a radial dimension by an axially extending member 951. FIG. 9 presents a schematic cross section of an acoustic panel 113 having an axially extending member 951 that extends across the full axial dimension of the acoustic panel 113. FIG. 10 presents a schematic cross section of an acoustic panel 113 having an axially extending member 951 that extends across a portion of the axial dimension of the acoustic panel 113.

The axially extending member 951 may radially segment one or more cells 218 of the acoustic panel 113. Radially segmenting the cells 218 may maintain or improve acoustic treatment functionality of the acoustic panel 113, and/or improve structural characteristics of the acoustic panel 113. The axially extending member 951 may extend the full axial and circumferential dimensions of the acoustic panel 113, or may extend only a portion of either or both of the axial and circumferential dimensions of the acoustic panel 113. The axially extending member 951 may at least partly define the cavity 425. In some embodiments, the axially extending member 951 forms the radially inner boundary of the cavity 425.

The axially extending member 951 may comprise composite. For example, the axially extending layer 951 may comprise fiberglass, a fiberglass and film adhesive, a fiberglass skin-core bond, or a supported film adhesive. The axially extending member 951 may comprise one or more layers of material.

Figure 8:
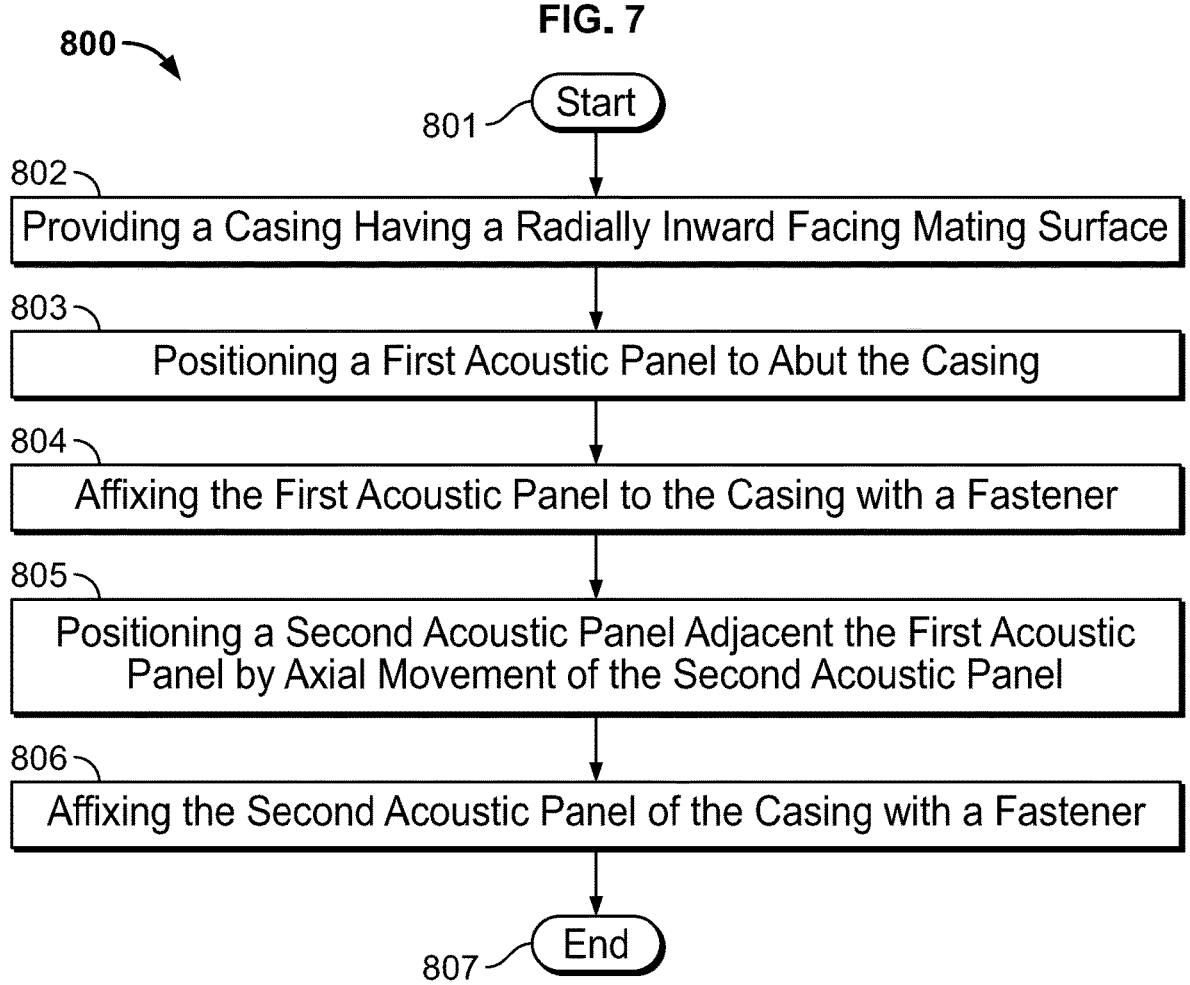
FIG. 8 is a flow diagram of a method in accordance with some embodiments of the present disclosure.

The present disclosure additionally provides methods of dampening noise in a rotating machine. One such method 800 is presented in the flow diagram of FIG. 8. Method 800 starts at Block 801. The steps of method 800, presented at Blocks 801 through 807, may be performed in the order presented in FIG. 8 or in another order. One or more steps of the method 800 may not be performed.

At Block 802, a casing 109 is provided. The casing 109 may be an annular casing disposed about at least a portion of a shaft 103 of the rotating machine or engine 101. The casing 109 may have a radially inward facing mating surface 220.

At Block 803, a first acoustic panel 113 is positioned to abut the casing 109. The first acoustic panel 113 may comprise an acoustic treatment member 214 extending between a radially inner skin 215 and a radially outer skin 216. The acoustic treatment member 214 may comprise a plurality of walls 217 that define a plurality of radially oriented cells 218. The first acoustic panel 113 has an axial dimension AD and a circumferential dimension CD. The radially inner skin 215 may extend the full axial dimension AD and the full circumferential dimension CD. The acoustic treatment member 214 may entirely overlay the radially inner skin 215. The radially outer skin 216 may form a radially outward facing mating surface 219. The first acoustic panel 113 may be positioned so that the mating surface 219 abuts the mating surface 220 of the casing 109. The abutting mating surfaces 219, 220 may be configured to effect axial movement between the mating surfaces 219, 220 while maintaining contact between the mating surfaces 219, 220.

At Block 804, the first acoustic panel 113 may be affixed to the casing 109 with a fastener 426. The fastener 426 may pass through an aperture in the casing 109 and an aperture in the radially outer skin 216 and into a cavity 425 defined by the acoustic treatment member 214. The fastener 426 may engage a portion of the radially outer skin 216 bounding the cavity 425 to thereby affix the first acoustic panel 113 to the casing 109.

At Block 805, a second acoustic panel 113 is positioned to abut the casing 109 adjacent the first acoustic panel 113. The second acoustic panel 113 may be of the same or similar construction as described above. The step of positioning the second acoustic panel 113 may comprise abutting the second acoustic panel 113 to the casing 109 at an axially displaced location from the first acoustic panel 113, and then axially moving the second acoustic panel 113 into position. The second acoustic panel 113 may be axially aligned with the first acoustic panel 113 when positioned.

At Block 806, the second acoustic panel 113 may be affixed to the casing 109 with a fastener 426. The fastener 426 may pass through an aperture in the casing 109 and an aperture in the radially outer skin 216 and into a cavity 425 defined by the acoustic treatment member 214. The fastener 426 may engage a portion of the radially outer skin 216 bounding the cavity 425 to thereby affix the second acoustic panel 113 to the casing 109.

Method 800 ends at Block 807.

The presently disclosed systems and methods have numerous advantages over prior art systems and methods. For example, the acoustic treatment member entirely overlays the radially inner skin. Thus in the disclosed systems and methods there are no apertures through the radially inner skin that would otherwise be necessary to access fasteners that are secured from a radially inward position relative to the acoustic panel. By affixing the acoustic panels to the casing from a radially outward position, the systems and methods of the present application increase the acoustic treatment surface of an acoustic panel and/or acoustic panel array. Even where acoustic panels may be mounted with a combination of radially-inward directed fasteners and radially-outward directed fasteners (such as in FIG. 7), the present disclosure reduces the number of apertures through the radially inner skin and acoustic treatment area of an acoustic panel to thus improve the acoustic treatment provided by the panel. Reduction and/or elimination of apertures through the radially inner skin and acoustic treatment member simplifies the manufacturing process for the acoustic panel as well.

Further, by providing for an acoustic panel that is axially moved into place rather than radially moved, the present disclosure allows for reducing the circumferential gaps required between adjacent panels of an acoustic panel array. Reducing and/or eliminating such circumferential gaps between panels also advantageously increases the acoustic treatment surface of the array. These increases in the acoustic treatment surface by removing apertures in the radially inner skin and acoustic treatment member and by more closely positioning the panels in an array can result in substantial improvements in noise treatment.

Although examples are illustrated and described herein, embodiments are nevertheless not limited to the details shown, since various modifications and structural changes may be made therein by those of ordinary skill within the scope and range of equivalents of the claims.

What is claimed is:

1. A system for acoustic dampening in a rotating machine, the rotating machine having a rotatable shaft defining an axis of rotation and a gas flowpath, the system comprising:
   an annular casing disposed radially outward of the rotatable shaft, the annular casing having a radially inward facing mating surface; and
   an acoustic panel affixed to said annular casing, the acoustic panel having an axial dimension and a circumferential dimension, the acoustic panel comprising:
   a radially inner skin facing the rotatable shaft and defining at least a portion of the radially outer boundary of the gas flowpath, the radially inner skin extending the full axial dimension and the full circumferential dimension of the acoustic panel;
   a radially outer skin forming a radially outward facing mating surface; and
   an acoustic treatment member extending between the radially inner skin and radially outer skin and overlaying the entirety of the radially inner skin, the acoustic treatment member defining a cavity that extends radially inward through a radially outer face of the acoustic treatment member only radially partway into the acoustic treatment member toward the radially inner skin such that a first portion of the acoustic treatment member is axially and circumferentially aligned with the cavity and located radially inward of the cavity, and the radial outer end of the cavity is bounded in part by a portion of said radially outer skin;
   wherein said acoustic panel is positioned so that the mating surface formed by said radially outer skin abuts the mating surface formed by said casing, the abutting mating surfaces being configured to effect relative axial movement between the surfaces while maintaining contact between the surfaces, and
   wherein said acoustic panel is affixed in position to said casing by one or more fasteners passing through said annular casing and the portion of the radially outer skin bounding the cavity defined by the acoustic treatment member,
   wherein said acoustic treatment member comprises a plurality of walls extending between the radially inner skin and radially outer skin to define a plurality of radially oriented cells,
   wherein the acoustic panel further includes an axially extending member, one or more of said plurality of radially oriented cells are radially segmented by the axially extending member, and at least a portion of the axially extending member is axially and circumferentially aligned with the cavity and located radially inward of the cavity.

2. The system of claim 1 wherein the rotating machine further comprises a fan track liner and wherein the acoustic panel is positioned forward of and adjacent the fan track liner.

3. The system of claim 1 wherein the rotating machine further comprises a fan track liner and wherein the acoustic panel is positioned aft of and adjacent the fan track liner.

4. The system of claim 1 wherein the gas flowpath comprises a bypass flowpath of the rotating machine.

5. The system of claim 1 wherein the cavity defined by the acoustic treatment member has a radial dimension less than the radial distance between the radially inner skin and the radially outer skin.

6. The system of claim 1 wherein the axially extending member extends less than the full axial dimension of the acoustic panel.

7. The system of claim 1 wherein the plurality of radially oriented cells form a honeycomb comprising a plurality of hexagons when viewed radially and the plurality of radially oriented cells includes cells that extend fully radially between the radially outer skin and the radially inner skin.

8. The system of claim 1 wherein the cavity defined by the acoustic treatment member is positioned along a first axial edge of the acoustic panel, and wherein the acoustic panel is configured to receive a second fastener proximate an opposing axial edge of the acoustic panel.

9. The system of claim 1 wherein the axially extending member extends the full axial and circumferential dimension of the acoustic panel.

10. A system for acoustic dampening in a rotating machine, the rotating machine having a rotatable shaft defining an axis of rotation and a gas flowpath, the system comprising:
   an annular casing disposed radially outward of the rotatable shaft, the annular casing having a radially inward facing mating surface; and
   a pair of acoustic panels affixed to said annular casing, each of said acoustic panels having an axial dimension and a circumferential dimension, each of said acoustic panels comprising:
   a radially inner skin facing the rotatable shaft and defining at least a portion of the radially outer boundary of the gas flowpath, the radially inner skin extending the full axial dimension and the full circumferential dimension of the acoustic panel;
   a radially outer skin forming a radially outward facing mating surface; and
   an acoustic treatment member extending between the radially inner skin and radially outer skin and overlaying the entirety of the radially inner skin, the acoustic treatment member defining a cavity that extends radially inward through a radially outer face of the acoustic treatment member only radially partway into the acoustic treatment member toward the radially inner skin such that a first portion of the acoustic treatment member is axially and circumferentially aligned with the cavity and located radially inward of the cavity, the radial outer end of the cavity bounded in part by a portion of said radially outer skin, wherein the acoustic treatment member of each of said acoustic panels comprises a plurality of walls extending between the radially inner skin and radially outer skin to define a plurality of radially oriented cells;
   wherein each of said acoustic panels is positioned so that the mating surface formed by said radially outer skin abuts the mating surface formed by said casing, the abutting mating surfaces being configured to effect relative axial movement between the surfaces while maintaining a radial alignment of the respective acoustic panel, and
   wherein said pair of acoustic panels are spaced apart at a distance less than the distance required to permit removal of a panel by radially inward movement,
   wherein each of said acoustic panels is affixed in position to said casing by one or more fasteners extending through said annular casing and the portion of the radially outer skin bounding the cavity defined by the acoustic treatment member without extending radially into the first portion of the acoustic treatment member or the radially inner skin.

11. The system of claim 10 wherein the plurality of radially oriented cells of each of said acoustic panels form a honeycomb, and wherein each acoustic panel further includes an axially extending member that is aligned axially and circumferentially with the cavity and located radially between the cavity and the first portion of the acoustic treatment member.

12. The system of claim 11 wherein one or more of the radially inner skin, radially outer skin, and axially extending member of each of the pair of acoustic panels comprises composite.

13. The system of claim 12 wherein one or more of the radially inner skin, radially outer skin, and axially extending member of each of the pair of acoustic panels comprises fiberglass.

14. The system of claim 10 wherein the rotating machine further comprises a fan track liner and wherein the pair of acoustic panels are positioned forward of and adjacent the fan track liner.

15. The system of claim 10 wherein the rotating machine further comprises a fan track liner and wherein the pair of acoustic panels are positioned aft of and adjacent the fan track liner.

16. The system of claim 11 wherein the axially extending member extends axially less than the full axial dimension of the acoustic panel so that a second portion of the acoustic treatment member includes radially oriented cells included in the plurality of radially oriented cells that extend fully radially between the radially outer skin and the radially inner skin.

17. The system of claim 16 wherein the acoustic treatment member includes a third portion that defines a portion of the cavity and is located radially between the axially extending member and the radially outer skin.

18. A method for mounting an acoustic panel array in a rotating machine, the rotating machine having a rotatable shaft defining an axis of rotation, the method comprising:
   providing an annular casing disposed radially outward of the rotatable shaft, the annular casing having a radially inward facing mating surface;
   positioning a first acoustic panel to abut the annular casing, the first acoustic panel having an axial dimension and a circumferential dimension and comprising an acoustic treatment member disposed between a radially inner skin and a radially outer skin, the radially inner skin extending the full axial dimension and full circumferential dimension of the first acoustic panel, the radially outer skin forming a radially outward facing mating surface, the first acoustic panel positioned so that the mating surface formed by said radially outer skin abuts the mating surface formed by said casing, the abutting mating surfaces being configured to effect relative axial movement between the surfaces while maintaining contact between the surfaces; and
   affixing the first acoustic panel to the annular casing with a fastener passing through said annular casing and said radially outer skin,
   wherein the acoustic treatment member defines a cavity that extends radially inward through a radially outer face of the acoustic treatment member only radially partway into the acoustic treatment member toward the radially inner skin such that a first portion of the acoustic treatment member is axially and circumferentially aligned with the cavity and located radially inward of the cavity, the radial outer end of the cavity bounded in part by a portion of said radially outer skin, and wherein said first acoustic panel is affixed in position to said casing by one or more fasteners passing through said annular casing and the portion of the radially outer skin bounding the cavity defined by the acoustic treatment member without extending radially into the first portion of the acoustic treatment member or the radially inner skin.

19. The method of claim 18 further comprising:

positioning a second acoustic panel adjacent the first acoustic panel by axial movement of the second acoustic panel, the second acoustic panel having an axial dimension and a circumferential dimension and comprising an acoustic treatment member disposed between a radially inner skin and a radially outer skin, the radially inner skin extending the full axial dimension and full circumferential dimension of the second acoustic panel, the radially outer skin forming a radially outward facing mating surface, the second acoustic panel positioned so that the mating surface formed by said radially outer skin abuts the mating surface formed by said casing, the abutting mating surfaces being configured to effect relative axial movement between the surfaces while maintaining contact between the surfaces; and affixing the second acoustic panel to the annular casing with a fastener passing through said annular casing and said radially outer skin.

20. The method of claim 18 wherein the acoustic panel further includes an axially extending member that is aligned axially and circumferentially with the cavity and located radially between the cavity and the first portion of the acoustic treatment member and wherein the axially extending member extends axially less than the full axial dimension of the acoustic panel so that a second portion of the acoustic treatment member includes radially oriented cells that extend fully radially between the radially outer skin and the radially inner skin.

* * * * *